INVENTOR.
JAMES W. SMITH
BY
George H. Fisher
ATTORNEY

Feb. 17, 1953 J. W. SMITH 2,629,073

ELECTRONIC AMPLIFIER

Filed March 5, 1949 2 SHEETS--SHEET 2

INVENTOR.
JAMES W. SMITH

BY George H. Fisher

ATTORNEY

Patented Feb. 17, 1953 2,629,073

UNITED STATES PATENT OFFICE 2,629,073

ELECTRONIC AMPLIFIER

James W. Smith, Minneapolis, Minn., assignor to Minneapolis-Honeywell Regulator Company, Minneapolis, Minn., a corporation of Delaware Application March 5, 1949, Serial No. 79,774

17 Claims. (Cl. 318—19)

This invention is concerned with electronic amplifiers, particularly that type of electronic amplifier having an output stage comprising a discriminator circuit wherein the voltages on the control electrodes in the tubes in the discriminator circuit are the same in magnitude and phase.

It is an object of this invention to devise apparatus incorporating a plurality of amplifiers electrically connected to a single bridge network to receive different signal voltages therefrom with said amplifiers operating in sequence as the balance point of the bridge is varied, said amplifiers being so constructed as to prevent excessive current flow through the bridge network.

Another object of the invention is to provide a simple bias voltage circuit in the discriminator stage which would involve fewer and less expensive components than the discriminator bias circuits now familiar in the art. This is accomplished by placing an alternating voltage on the cathodes of the tubes in the discriminator stage. The alternating voltage may be obtained from a transformer secondary which is center-tapped to ground. The voltages impressed on the cathode and plate of each individual tube are of the same phase.

Another object of the invention is to provide means for preventing the control electrode in the tube in the discriminator stage which is not conducting from drawing current, being driven negative, and driving the control electrode of the other tube in the discriminator circuit negative and holding the said other tube out of the conducting range. This is accomplished by placing a capacitor between each control electrode and separate connections to the anode of the tube in the previous stage. This necessitates a voltage on one control electrode passing through two capacitors before it gets to the other control electrode and effectively prevents any direct voltage from passing from one control electrode to the other. Two capacitors are needed in order that the voltage impressed on the two control electrodes be the same.

Another object of the invention is to provide means for preventing the control electrodes in the tubes in the discriminator stage from producing an alternating current loading on the previous stage in the amplifier. This is accomplished by placing a resistor of appreciable magnitude between each control electrode in the discriminator stage and the anode of the tube in the previous stage to damp out any alternating current which might tend to flow from control electrode to cathode in the tubes in the discriminator stage.

Another object of the invention is to provide means in the discriminator circuit for discriminating against out-of-phase signals. This is accomplished by the use of a pair of grid-current limiting resistors and a pair of capacitors in the input circuit to the tubes in the discriminator circuit. The resistors determine the maximum positive voltage which the grids of the tubes can assume with respect to the cathodes and the capacitors charge up an amount sufficient to subtract a voltage from the alternating signal and bias voltages to leave a voltage no greater at any time than the maximum permissible positive voltage on the grids. The capacitors discharge through the grid-current limiting resistors and, in doing so, combine with the alternating signal and bias voltages to produce the effective signal voltage on the grids. When the alternating signal voltage is not in phase with the supply voltage the effective signal voltage due to this interaction will also not be in phase with the supply voltage and will result in discrimination against the effective signal voltage and thus against the alternating signal voltage.

These and other objects and advantages may be better understood by a study of the following detailed description of the invention in conjunction with the drawing in which Figure 1 is a schematic diagram embodying the various features of the invention.

Figure 1:
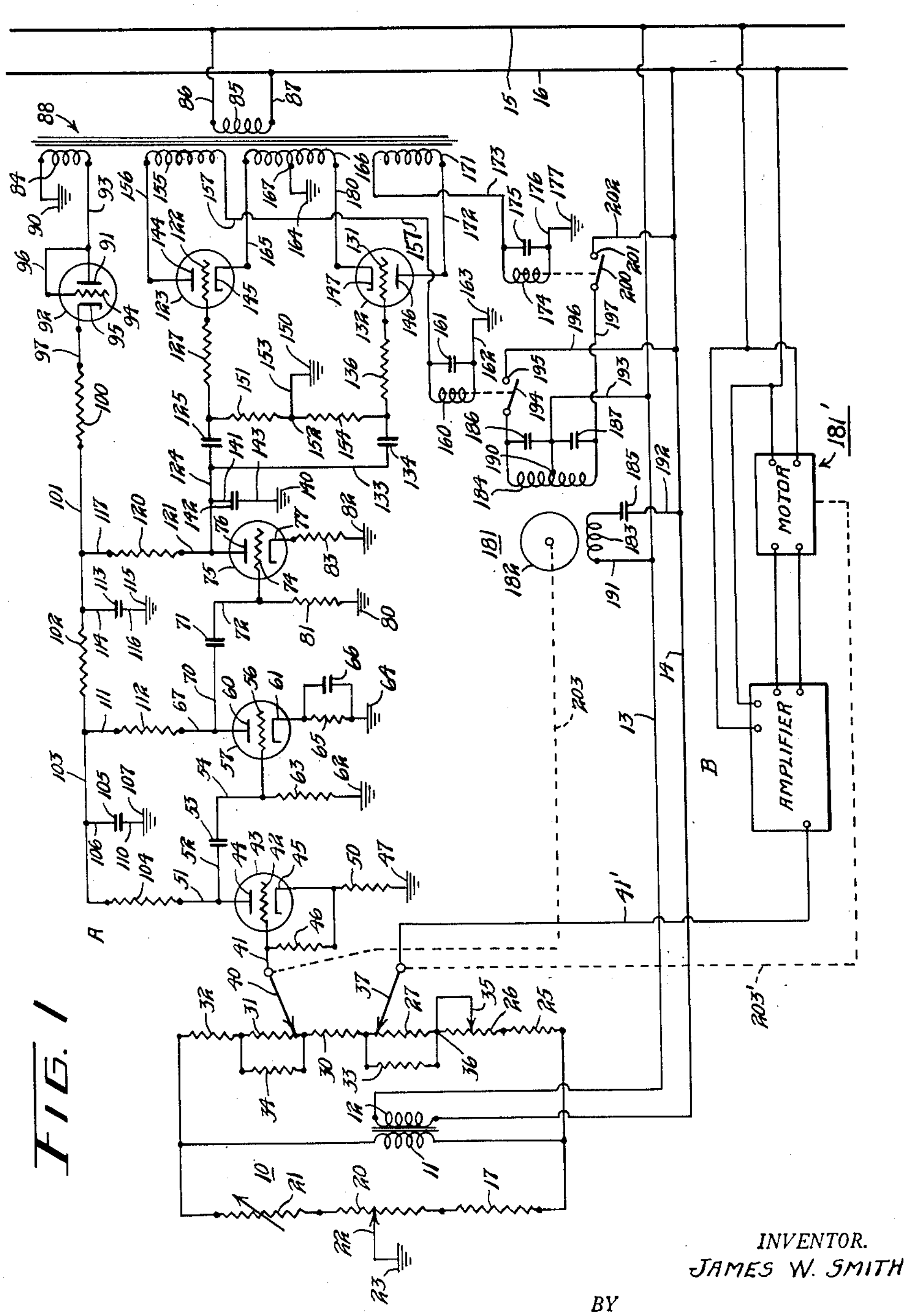

A bridge network 10 is shown to have two signal voltage outputs taken off wiper arms 40 and 37 to operate a pair of amplifiers A and B. Operation of amplifier A energizes a motor 181 while operation of amplifier B energizes a motor 181'. Motor 181 is connected to wiper arm 40 to drive it to the null point on the bridge and motor 181' is connected to wiper arm 37 to drive it to the null point on the bridge. Unless either wiper arm 40 or wiper arm 37 is at the null point both amplifiers will have a signal input voltage to cause operation of both amplifiers. Mechanical stops are provided for the motors, however, to prevent the wiper arms from being moved off the follow-up potentiometers 31 and 27.

Two separate amplifiers are shown in the drawing and are designated as A and B. These amplifiers are identical and therefore amplifier B has been shown only in box form.

The electrical bridge 10 furnishes the signal voltage to the two amplifiers. The bridge 10 is energized from a transformer secondary 11 having a primary 12 which is connected through leads 13 and 14 to the power leads 15 and 16 leading to a suitable source of power (not shown). As shown in the drawing, bridge 10 is a temperature control bridge and is capable of producing a signal voltage for heating or cooling. The bridge 10 has resistors 17, 20 and 21 connected in series across transformer secondary 11. Resistor 21 is the thermostat resistor and varies in temperature. Resistor 20 has a movable tap 22 tied to ground at 23 and is a temperature setting resistance. That is, the variable tap 22 may be moved in one direction or the other along resistance 20 depending upon the temperature desired, in order that the bridge will produce a signal voltage sufficient to energize either amplifier A or B when the actual temperature varies by a given predetermined amount from the desired temperature. Resistor 17 is to balance the left side of the bridge, that is to approximately equal the resistance of thermostat 21 to provide a range of satisfactory operating points for wiper arm 22 along resistor 20.

Also connected in series across transformer secondary 11 are fixed resistor 25, calibrating resistor 26, cooling potentiometer 27, gap resistor 30, heating potentiometer 31 and fixed resistor 32. Cooling potentiometer 27 and heating potentiometer 31 are follow-up or rebalancing potentiometers and have throttling resistors 33 and 34, respectively, connected in parallel therewith. Calibrating resistor 26 has a movable wiper arm 35 connected to terminal 36 between calibrating resistor 26 and cooling potentiometer 27 which is movable across resistor 26 for adjustment purposes so that the proper amplifier will be energized at a given temperature difference from that temperature desired. Cooling potentiometer 27 has a wiper arm 37 which passes over the potentiometer and is driven by a motor in a manner later to be described. The throttling resistor 33, placed in parallel with cooling potentiometer 27, is for the purpose of obtaining the throttling range desired, that is, the change in temperature which will cause the motor driving the wiping arm to drive the wiping arm from one end of the potentiometer winding to the other. Gap resistor 30 is to prevent hunting at a changeover from operation of the wiper arm on the cooling potentiometer to the wiper arm on the heating potentiometer by providing a voltage range for a range of temperatures at which neither the heating nor cooling controls will be energized. The heating potentiometer 31 has a wiper arm 40 which operates across the potentiometer winding in response to a motor in a manner later to be described. The throttling resistor 34 in parallel with heating potentiometer winding 31 serves the same purpose as does throttling resistor 33 with respect to heating potentiometer winding 37. By the use of these throttling resistors 33 and 34 much finer adjustments are possible with wiper arms 37 and 40 moving across potentiometers 27 and 31 respectively in that comparatively large potentiometers may be used even though it is desired that only a small voltage drop be produced across them. Resistors 25 and 32 are fixed resistors serving merely to place a proper potential range on the cooling and heating potentiometers.

Values for the above mentioned resistors which are found to operate very satisfactorily in the bridge are as follows:

| | Ohms |
|---|---|
| Resistor 17 | 1000 |
| Resistor 20 | 30 |
| Thermostat resistor 21 | 1000 |
| Fixed resistor 25 | 1000 |
| Calibrating resistor 26 | 30 |
| Cooling potentiometer 27 | 135 |
| Gap resistor 30 (for ½° to 1° gap) | 1.2 |
| Heating potentiometer 31 | 135 |
| Fixed resistor 32 | 1000 |
| Throttling resistor 33 (for 5° throttling range) | 6 |
| Throttling resistor 34 (for 5° throttling range) | 6 |

It is understood, of course, that the above values given are not the only ones that will work satisfactorily but that they are merely given as an example set of values.

Wiper arm 40 on heating potentiometer 31 is connected by means of lead 41 to grid 42 of tube 43 in amplifier A. Correspondingly, wiper arm 37 of cooling potentiometer 27 is connected through lead 41′ to a similar circuit in amplifier B. Tube 43 has in addition to grid 42, a plate 44 and a cathode 45. Grid 42 is connected to cathode 45 through a resistor 46 while the cathode 45 is connected to ground 47 through a resistor 50. The resistor 50 is unbypassed in order to provide an alternating voltage bias on the cathode 45 and limit the amount of grid current which may be drawn by grid 42 upon the controlling temperature being in the range to cause operation of amplifier B, energization of motor 181′, and movement of wiper arm 27. Drawing of grid current by tube 43 would load bridge 10 and affect the magnitude of signal at the position where the bridge is most nearly balanced. This is particularly important where, as in the present arrangement, the bridge 10 is connected to a plurality of amplifiers.

The plate 44 of tube 43 is connected to conductor 52, capacitor 53, and conductor 54 to grid 56 of tube 57 which is part of the second stage of amplifier A. Tube 57 also has an anode 60 and a cathode 61. The grid 56 of tube 57 is connected to ground 62 through resistor 63. The cathode 61 is connected to a ground 64 through a resistor 65 which is bypassed by capacitor 66.

The plate 60 of tube 57 is connected through lead 70, capacitor 71 and lead 72 to a grid 74 of a tube 75 comprising the third stage of amplifier A. Tube 75 has in addition to the control electrode or grid 74 a plate 76 and a cathode 77. The grid 74 is connected to a ground 80 through resistor 81 while the cathode 77 is connected to a ground 82 through an unbypassed resistor 83. The purpose of the unbypassed cathode resistor 83 in the third stage of the amplifier is to obtain a symmetrical square wave output from the third stage and to thus obtain proper operation of the succeeding amplifier stages.

A direct current plate supply for the first three stages is obtained from a rectifier tube 92 and a transformer secondary 84 of a transformer 88 having a primary 85 connected to power leads 15 and 16 through leads 86 and 87. One terminal of transformer secondary 84 is connected to ground at 90 while the other terminal is connected to plate 91 of the rectifier tube 92 through lead 93. Tube 92 also has a grid 94 and a cathode 95. Because the tube used is a high mu tube, it is necessary to connect the grid 94 to the plate 91 through a lead 96 in order that the tube will operate as a rectifier. The cathode 95 of the rectifier tube 92 is connected through lead 97, a resistor 100, lead 101, a resistor 102, lead 103, resistor 104 and lead 51 to the plate 44 of tube 43 comprising the first stage of amplifier A. A capacitor 105 is connected to lead 103 through a lead 106 and is connected to ground 107 through a lead 110 and is used as a filter to prevent ripple in the supply voltage from reaching the plate 44 of tube 43 and plate 60 of tube 57.

The cathode 95 of tube 92 is also connected to plate 60 of tube 57 in the second stage through lead 97, resistor 100, lead 101, resistor 102, leads 103 and 111, resistor 112 and lead 67. A filter capacitor 113 is connected from lead 101 through lead 114 and is tied to ground 115 through lead 116 to prevent ripple in the plate supply voltage from reaching the anode 76 of tube 75.

The greatest amount of filtering is obtained for the preliminary stages. The slight ripple which remains in the supply voltage upon reaching the plate of the first stage is amplified and reversed in phase and applied to the input circuit of the second stage. Because of this reversal in phase the ripple from the first stage applied to the second stage will be of opposite phase to the ripple on the plate of the second stage and the two ripple voltages will tend to cancel each other out. This is known as a hum bucking action.

Cathode 95 of tube 92 is also connected through lead 97, resistor 100, leads 101 and 117, resistor 120 and lead 121 to anode 76 of tube 75 to furnish the plate supply voltage for the third stage.

The output circuit of tube 75 is connected to the input of the discriminator stage which comprises tubes 123 and 132. The connections are such that the voltage applied to the input circuits of tubes 123 and 132 are in phase. These connections will now be traced.

Anode 76 of tube 75 is connected to grid 122 of the discriminator tube 123 through a lead 124, a capacitor 125 and a resistor 127. Anode 76 is also connected to grid 131 of the discriminator tube 132 through leads 124 and 133, capacitor 134 and resistor 136.

Anode 76 is further tied to ground 140 through leads 124 and 141, capacitor 142 and lead 143. The capacitor 142 acts as a short circuit to ground for high frequency.

Tube 123 has, in addition to grid 122, a plate 144 and a cathode 145. Tube 132 has, in addition to grid 131, a plate 146 and a cathode 147. Grid 122 of tube 123 is tied to ground 150 through resistors 127 and 151, and lead 153. Grid 131 of tube 132 is tied to ground 150 through resistors 136 and 154 and lead 153. An alternating power source for the plate 144 of tube 123 is supplied from transformer secondary 155 of transformer 88 through lead 156. Plate 144 of tube 123 is further connected to a load circuit and ground through lead 156, transformer secondary 155, lead 157, relay coil winding 160 having a capacitor 161 in parallel therewith, lead 162 and ground 163.

Cathode 145 of tube 123 is connected to ground 164 through lead 165, one half of transformer secondary winding 166 of transformer 88, and center tap 167 of transformer secondary winding 166 to ground 164.

Anode 146 of tube 132 receives plate supply voltage from transformer secondary 171 of transformer 88 through lead 172. Anode 146 is further connected to a load and ground through a circuit consisting of lead 172, transformer secondary winding 171, lead 173, relay winding 174 having capacitor 175 in parallel therewith, lead 176 and ground 177.

Cathode 147 of tube 132 is connected to ground 164 through lead 186, one half of transformer secondary winding 166, and the center tap 167.

The polarities of the transformer secondaries 155, 166, and 171 are such that when transformer secondary 155 drives plate 144 of tube 123 positive with respect to ground, transformer secondary 166 drives cathode 145 of tube 123 positive with respect to ground. In the same fashion when plate 146 of tube 132 is positive with respect to ground, cathode 147 of the same tube is also positive with respect to ground. Thus it can be seen that transformer secondary 166 places an alternating voltage bias on cathodes 145 and 147 which necessitates a more positive signal voltage on the grid of the respective tubes to cause either one tube or the other to conduct when the plate is positive than would be the case were there no bias present. This method of placing a bias on the cathodes of the two tubes in the discriminator circuit composed of tubes 123 and 132 makes it possible to use a single transformer secondary which has been center-tapped to ground and reduces the number of parts or components hitherto considered necessary to place bias voltages on the cathodes of tubes in discriminator circuits.

The capacitors 125 and 134 have been placed into the circuit so that the path from grid 122 of tube 123 to grid 131 of tube 132 will go from grid 122, through resistor 127, capacitor 125, lead 133, and capacitor 134, resistor 136, to grid 131. It is necessary to separate the grids in this manner so that, for example, when tube 123 would normally be in a condition to conduct, that is, with plate 144 having a positive potential with respect to the cathode 145 and a positive signal appearing on grid 122 and plate 146 of tube 132 being negative with respect to cathode 147, grid 131 of tube 132 will not have a tendency to draw current from cathode 147, drive grid 131 negative and impress that potential on grid 122 of tube 123 and so prevent tube 123 from conducting. If the voltage on grid 131 of tube 132 could be impressed on grid 122 of tube 123 the action of tube 132 would be that of a D. C. restorer. The action of the two capacitors 125 and 134 is to stop any direct current flow and thus prevent a tube whose plate is negative from acting as a D. C. restorer on the other tube which would normally be in the conducting range.

While the capacitors 125 and 134 stop the direct current which might flow from either of the grids in tubes 123 and 132 they do not have any effect on the alternating current, which if it reached any magnitude, would have a deleterious effect on the operation of the third stage, which comprises tube 75. In order to reduce any alternating current tendencies from grids 122 and 131 to insignificant limits grid limiting resistors 127 and 136 have been placed in the circuits of grids 122 and 131, respectively.

Resistors 151 and 154 operate to place bias voltages on grids 122 and 131 respectively to stabilize the operation of tubes 123 and 132.

A motor 181 is shown having an armature 182 and field windings 183 and 184. Field winding 183 is connected in series to a capacitor 185 while field winding 184 is in parallel with capacitors 186 and 187. The junction of capacitors 186 and 187 is tied to a center tap 190 on field winding 184.

Field winding 183 is energized from power leads 15 and 16 as follows: power lead 15, leads 13 and 191, field winding 183, capacitor 185, leads 192 and 14, and power lead 16. Thus it can be seen that field winding 183 is constantly energized.

The upper half of field winding 185 is energized from power lead 15 through leads 13 and 193, center tap 190 of field winding 184, the upper half of field winding 184, movable relay contact 194, fixed relay contact 195, and leads 196 and 14 to power lead 16. Movable relay contact 194 is moved in response to energization of relay winding 160 which is energized upon operation of tube 123.

The other half of field winding 184 is energized from power lead 15 through leads 13 and 193, center tap 190 of field winding 184, the lower half of field winding 184, lead 197, movable relay contact 200, fixed relay contact 201, and leads 202 and 14 to power lead 16. Movable relay contact 200 operates to make contact with fixed contact 201 upon energization of relay winding 174 which is energized upon operation of tube 132.

When in a normal unenergized position, relay contacts 194 and 195 and 200 and 201 are open and field winding 184 is unenergized. If both relay contacts 194 and 195 and 200 and 201 were closed the current through the two halves of field winding 184 would cancel each other out and the armature 182 would still not rotate. Because the movable contacts 194 and 200 close contact with fixed contacts 191 and 201 respectively in accordance with operation of tubes 123 and 132, respectively, it is not possible for both sets of contacts to close at the same time, due to the operation of tubes 123 and 132 previously explained.

Motor armature 182 is connected through mechanical linkage 203 to wiper arm 40 on heating potentiometer 31 to move wiper arm 40 in one direction or the other depending on the direction of energization of field winding 184 which causes selective rotation of armature 182.

One set of values which will operate satisfactorily in this circuit is as follows:

| | |
|---|---|
| Resistors 46, 127, 136 | 0.1 megohm |
| Resistor 50 | 5600 ohms |
| Resistors 63, 81 | 0.47 megohm |
| Resistor 65 | 10,000 ohms |
| Resistors 83, 100 | 8,200 ohms |
| Resistor 102 | 22,000 ohms |
| Resistors 104, 112, 120 | 0.27 megohm |
| Resistors 151, 154 | 1.0 megohm |
| Capacitors 53, 71, 125, 134 | 0.05 microfarad |
| Capacitor 66 | 20 microfarads |
| Capacitor 105, 113 | 10 microfarads |
| Capacitor 142 | 0.01 microfarad |
| Capacitors 161, 175 | 12 microfarads |
| Tube 43, 57 | 12SL7GT |
| Tube 75, 92 | 12SL7 |
| Tube 123, 132 | 2C50 |
| Voltage across secondary 84 | 250 volts |
| Voltage across secondaries 155, 171 | 225 volts |
| Voltage across secondary 166 | 40 volts |

It is understood of course, that the values given above are only for sake of example and do not limit my invention as various changes may easily be made by one skilled in the art.

*Operation*

For the sake of the description of the operation, let it be assumed that the desired temperature is 70° F., and that wiper arm 22 has been adjusted to such a position on resistor 20 that at 70° no unbalance voltage exists between wiper arms 22 and 40 with wiper arm 40 at the lower end of resistor 31 and wiper arm 37 at the upper end of resistor 27. This position is shown in the drawing. Also let the operation be considered during the half-cycle in which power lead 15 is positive with respect to power lead 16. This results in the upper end of transformer secondary winding 11 being negative with respect to its lower end, as is true with secondary windings 84, 155, 166 and 171. Now let it be assumed that the region in which thermostat 21 is placed is suddenly cooled, decreasing the resistance of thermostat 21. This will result in a smaller resistance between wiper arm 22 and the upper end of transformer 11 than there was when the temperature was at 70° F. The resistance between wiper arm 40 and the upper end of transformer secondary 11 remains the same, however, and thus wiper arm 40 is driven positive with respect to wiper arm 22 and thus with respect to ground. This results in a signal voltage passing through a positive half cycle being placed on grid 42 of tube 43 and causes tube 43 to conduct. This alternating signal voltage which has been impressed on grid 42 will be amplified through tubes 43, 57 and 75 and the resulting output voltage from tube 75 which will be passing through a negative half cycle will be impressed on grids 122 and 131 of tubes 123 and 132, respectively. At this half of the cycle the upper end of the transformer secondaries 155 and 171 are negative, it will be recalled, and thus plate 144 of tube 123 is negative with respect to cathode 145 and the tube 123 will not conduct. Plate 146 of tube 132 will be positive with respect to cathode 147, however, but because of the negative signal voltage on grid 131, tube 132 will not conduct either.

On the next half cycle the upper ends of transformer secondaries 11, 84, 155, 166 and 171 will be positive with respect to their lower ends and so wiper arm 40 will be negative with respect to wiper arm 22. This results in grid 42 of tube 43 being negative, plate 44 of tube 43 and thus grid 58 of tube 57 being positive, and plate 60 of tube 57 and grid 74 of tube 75 being negative to cause plate 76 of tube 75 to be positive. This results in a signal voltage passing through a positive half cycle being placed on the grids 122 and 131 of the discriminator tubes 123 and 132.

With the plate 144 and grid 122 of tube 123 both positive with respect to cathode 145 this tube will conduct and energize relay winding 160 to close contacts 194 and 195 and energize the upper half of field winding 184 of motor 181. This causes armature 182 to rotate and move wiper arm 40 on heating potentiometer 31 upward along the potentiometer until wiper arm 40 and wiper arm 22 are again at the same potential which will cause the signal voltage to grid 42 of tube 43 to be reduced so that neither of tubes 123 and 132 will conduct.

If the space in which thermostat 21 is placed now begins to heat up, the amplifier will operate on the half cycle when the transformer secondaries 11, 155, 166 and 171 have their upper ends negative with respect to their lower ends. On this half cycle wiper arm 40 will be negative with respect to wiper arm 22 and thus place a signal voltage passing through a negative half cycle on grid 42 of tube 43. This signal voltage will be amplified through the first three amplifying stages and will be impressed as a signal voltage passing through a positive half cycle on grids 122 and 131 of tubes 123 and 132 respectively. Plate 146 of tube 132 will now be positive with respect to cathode 147 and tube 132 will conduct, energizing relay winding 174 and closing contacts 200 and 201 to energize the lower half of field winding 184 and cause armature 182 to rotate in the opposite direction to that previously described and move wiper arm 40 down along heating potentiometer 31 until the potential across wiper arms 40 and 22 is zero and thus reducing the signal voltage on grid 42 of tube 43. When this signal voltage has been wiped out neither of the two tubes 123 and 132 in the discriminator circuit will conduct and thus neither relay winding 160 nor relay winding 174 will be energized and relay contacts 194 and 195 and 200 and 201 will be open and motor armature 182 will not be energized.

During the entire operation described so far, the potential of wiper 37 has not been the same as that of wiper 22. Thus during the half cycle in which the transformer secondaries 11, 155, 166 and 171 have their upper ends negative with respect to their lower ends, the wiper 37 has been positive with respect to wiper 22. As will be clear from the foregoing explanation, the effect of this, since amplifier B and motor 181′ are the same as amplifier A and motor 181, will be to tend to cause motor 181′ to move wiper arm 37 upwardly. Due to the fact that the wiper arm 37 is at the extreme upward range of its movement, however, this will be prevented either by a stop or a limit switch or some other suitable means for limiting movement of wiper arm 37. Thus, all the time that the temperature of the space in which thermostat 21 is placed is within the range of temperatures at which movement of the slider 40 occurs, the motor 181′ will remain stationary with the wiper 37 in its uppermost position. All this time, a signal is being impressed upon amplifier B. Due to the effect, however, of the cathode biasing resistor of amplifier B corresponding to the resistor 50 in amplifier A, the amount of grid current will be held to a minimum to prevent an undue effect upon the bridge. Thus, the cathode resistor of the amplifiers of the present invention is of particular importance with an arrangement such as I have disclosed in which a plurality of rebalancing systems will be associated with a single bridge.

If the space in which thermostat 21 is placed rises a predetermined amount above the 70° F., represented by resistor 30, wiper arm 37 will be operated on and will control the energization of amplifier B in the same manner as just described for amplifier A. That is, a rise in the temperature increases the resistance of thermostat 21 so that, upon the half cycle that the upper end of transformer secondary 11 is positive with respect to the lower end, wiper arm 37, moving along cooling potentiometer 27, is positive with respect to wiper arm 22. As stated previously, amplifier B is identical with amplifier A and, therefore, because it has been seen that with wiper arm 40 positive with respect to wiper arm 22 there will be no energization of motor 181 it follows that with wiper arm 37 positive with respect to wiper arm 22 there will be no energization of motor 181′.

However, on the following half cycle amplifier B will be energized, just as is amplifier A, to energize motor 181′ which will move wiper arm 37 down along potentiometer 27 until the voltage difference between wiper arms 37 and 22 is insufficient to energize the discriminator stage in amplifier B.

Upon the temperature warming up and approaching 70° F., the wiper arm 37 will be negative with respect to wiper arm 22 on the half cycle that the upper end of transformer secondary is positive with respect to the lower end and the energization of amplifier B will be reversed to that just described and cause motor 181′ to move wiper arm 37 upwardly along potentiometer 27 until the voltage difference between wiper arms 37 and 22 is insufficient to energize the discriminator stage in amplifier B.

The motor armature 182 may also operate a damper or other device to control the temperature of the region in which thermostat 21 is placed in the direction called for by the bridge to bring the temperature back to 70° F.

A brief description will now be given of the curves shown in Figures 2–6 which show the manner in which this circuit discriminates against out-of-phase signals. Let it be assumed that tube 123 of Figure 1 is the tube concerning which these curves have been drawn.

In Figures 2 to 6, the curve 210 indicates the plate voltage on plate 144 of tube 123 and is used as the reference voltage. The alternating grid bias voltage which also remains constant with respect to the plate voltage has been designated as curve 211 and, as can be seen, is out-of-phase with the plate voltage. This voltage it is remembered comes from the upper half of transformer secondary winding 166 and is the alternating grid bias voltage with which this invention is concerned. Curve 212 is the incoming signal voltage and is not seen in Figure 2 because this set of curves is for the no-signal input voltage condition. Curve 213 is the alternating component of the grid voltage due to the upper half of transformer secondary winding 166 and the incoming signal voltage added together. In a no-signal voltage condition assumed in Figure 2, this curve is identical with curve 211 and thus, for the purpose of avoiding confusion, is not shown in the figure. Curve 214 is the direct current bias voltage which is due to the algebraic sum of the alternating bias voltage plus the incoming signal voltage. This direct current bias voltage results from grid rectification of tube 123 when grid 122 is positive with respect to cathode 145. The grid current limiting resistor 127 operates to prevent the potential on the grid 122 from rising above a predetermined value of positive potential with respect to acthode 145. This grid current limiting property of resistor 127, with the similar action of resistor 136, operates to isolate the tubes 123 and 132 from each other in preventing operation of one of the tubes from affecting the potentials on the electrodes of the other tube. Adding curve 213 (in Figure 2 identical with curve 211 and thus not shown) and curve 214 results in the total effective bias voltage on the grid 122 of the tube 123. This curve is shown as curve 215. In the family of curves shown in Figure 2, it is seen that curve 215, the total effective bias voltage, is out of phase with respect to the voltage on the plate which is curve 210. It can be seen in Figure 2 that curve 215 never rises above a predetermined value above the axis. The direct current bias voltage charges up on capacitor 125 and is then discharged through resistor 151. The values of capacitor 125 and resistor 151 determine the time constant which regulates the speed with which capacitor 125 charges and discharges. Because the total effective bias voltage is sufficiently negative during the positive half cycle of the plate voltage, tube 123 will not conduct at any time under no-signal conditions.

Figures 2, 3, 4, 5, 6:
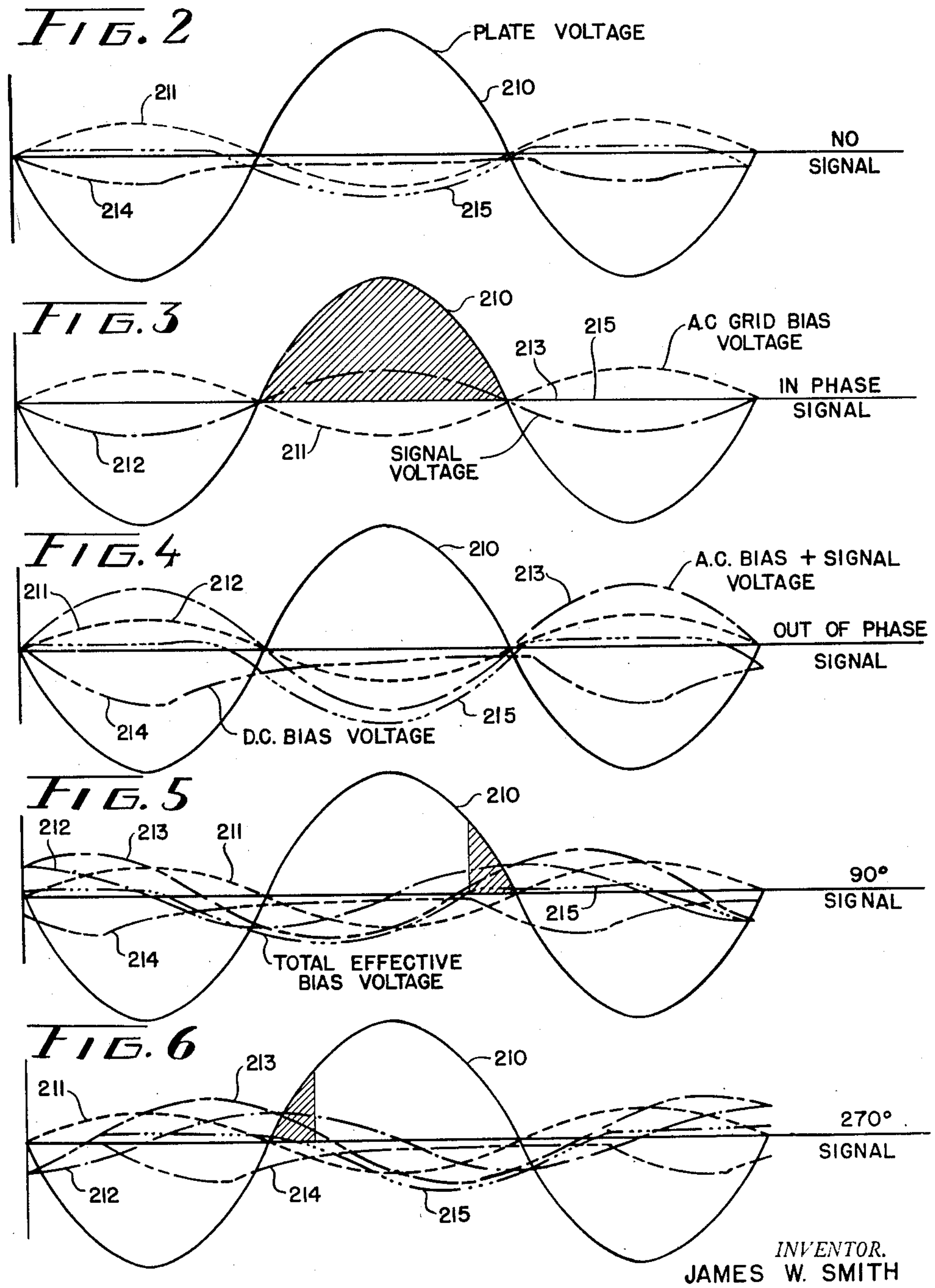
Figure 2 is a graph showing how the effective bias voltage is obtained in the discriminator stage with no signal input voltage.
Figure 3 is a graph showing how the effective bias voltage is obtained in the discriminator stage with an in-phase signal input voltage.
Figure 4 is a graph showing how the effective bias voltage is obtained in the discriminator stage with an out-of-phase signal input voltage.
Figure 5 is a graph showing how the effective bias voltage is obtained in the discriminator stage with a 90° signal input voltage.
Figure 6 is a graph showing how the effective bias voltage is obtained in the discriminator stage with a 270° signal input voltage.

In Figure 3 the in-phase signal condition is shown and to simplify the drawing the signal voltage from the previous stage is shown to have the same magnitude as the alternating grid bias voltage continually impressed upon the tube 123. Adding together curves 211 and 212 produces the curve 213 which in this case lies directly along the axis. As curve 214 depends upon the magnitude of curve 213 or in other words as the direct bias voltage depends upon the total alternating bias voltage, curve 214 for the direct bias voltage, is non-existent in the condition shown in Figure 3 and thus is not shown. As curve 215, the total effective bias voltage, is dependent upon the total alternating bias voltage plus the direct bias voltage the curve 215 also lies along the axis and has a constant zero value under the conditions shown. Therefore, as indicated by the shading, tube 123 conducts during the entire positive half cycle of the plate voltage on plate 144 of the tube.

Figure 4 shows the condition where an out-of-phase voltage is impressed upon grid 122 from the previous stage. In this stage the curve 211, the alternating grid bias voltage, and curve 212, the incoming signal voltage, are superimposed and appear as one curve. Curve 213 is shown as the result of the addition of curves 211 and 212 and thus indicates the total effective alternating bias voltage. As explained in Figure 2, the curve 214 which is the direct current bias voltage resulting from charging of the capacitor 125 through resistor 151 and due to the effect of the current limiting resistor 127 is shown as opposing the total alternating bias voltage by a sufficient amount to prevent the total effective bias voltage on the grid 122 of the tube from exceeding a predetermined given positive value. The addition of curves 213 and 214 then produce the curve 215 which, because it is negative with respect to the positive plate voltage on the positive half cycle of the plate voltage, prevents the tube from conducting during any part of the cycle.

In Figure 5, the condition is shown for a 90° signal voltage. In this case again, the plate voltage 210 and the alternating grid bias voltage 211 are not changed. As can be seen in the drawing, however, the curve 212 which is the incoming alternating signal voltage has been advanced by 90° and the addition of these two curves, 211 and 212, produce the total alternating bias voltage curve 213. Again, because the grid current limiting resistor 127 prevents the potential on grid 122 from rising above a given predetermined positive value, the curve 214 is of such value as to prevent the total effective bias from rising above that given predetermined value. The resulting curve 215 again is the result of the addition of curves 213 and 214 and as can be seen in these drawings, has decreased to a sufficiently small negative value near the end of the positive half cycle of the plate voltage that the tube conducts for a very short period of time. This small period of conduction, however, is insufficient to cause operation of the motor 181.

In Figure 6 the 270° signal voltage condition is shown. In this case again, the plate voltage curve 210 and the alternating grid bias voltage 211 due to the upper half of transformer secondary winding 166 remains the same. It is seen, however, that the incoming signal voltage 212 has been displaced to 90° behind the alternating grid bias voltage and the addition of curves 212 and 211 produce the resultant total alternating bias voltage curve 213. Again, curve 214 is dependent in magnitude upon the magnitude of the total alternating bias voltage curve to prevent the voltage on the grid 122 from rising above a predetermined positive value as has been before stated. The addition of curves 214 and 213 produce the total effective bias voltage curve 215 which, as seen in the drawing of Figure 6, is sufficiently small in a negative direction to permit conduction during the first part of the cycle when the plate voltage is positive. This small amount of conduction is, however, insufficient to cause operation of motor 181.

It is thus demonstrated by the curves shown for these various conditions the manner in which the conduction of the tube will vary with change in phase of the input signal voltage. It thus should be readily obvious that for a signal which is, for example, only 60° out of phase, the tube 123 will conduct for a greater part of the cycle than it does for a 90° signal though it will not conduct over the entire half cycle. Likewise, if the signal should, for example, be 300° out of phase the tube will conduct over a greater portion of the first part of the cycle when the plate voltage is positive though it will not conduct over the entire positive half cycle. Also, if the signal should be progressively greater than 90° out of phase or progressively less than 270° out of phase, the conduction of the tube will be less and less until eventually the tube will not conduct at all.

While I have shown a single circuit embodying the various features of my invention it will be apparent to those skilled in the art that modifications may be made without departing from the scope or spirit of the invention and that accordingly I consider my invention limited only to the scope of the claims appended hereto.

I claim as my invention:

1. In combination: signaling means comprising a bridge having a plurality of output signal voltages, each of which differs in value from the remainder; rebalancing means for independently reducing any one of said voltages to zero; a plurality of electronic amplifiers; means connecting said amplifiers with said bridge such that each amplifier is affected by a separate output signal voltage from said bridge; a separate motor energized by each of said amplifiers; means connecting said motors to said rebalancing means; means enabling only one of said rebalancing means to be rebalanced at a given time; and bias means in each of said amplifiers to limit the grid current in said amplifiers and reduce loading of said bridge by said amplifiers.

2. In combination: a controlling condition; a plurality of signal voltages resulting from said controlling condition; and means energized from said signal voltages to reduce any one of said voltages to zero, said means comprising an amplifier to be operated by each of said voltages, a motor to be energized by each of said amplifiers, a connection between each motor and an input circuit to the amplifier energizing that motor by which energization of each motor tends to reduce the signal voltage to that amplifier to zero, limiting devices to prevent more than one voltage from being reduced to zero at a time, and biasing means in each of said amplifiers to limit the grid current drawn by said amplifiers and reduce loading of said controlling condition by said amplifiers.

3. In combination: an electrical bridge signaling means having a plurality of signal voltage outputs each differing in value from the remainder; a plurality of amplifiers each having a plurality of stages; means connecting said amplifiers to said bridge such that each amplifier is affected by a separate output voltage from said bridge; bias means in the first stage of each amplifier such as to limit the grid current drawn by the first stage and reduce possible loading of the bridge; and a further stage in each amplifier having a selective output voltage dependent upon the direction of the signal voltage causing operation of the amplifier.

4. In combination: an electrical bridge signaling means having a plurality of signal voltage outputs, each differing in value from the remaining signal voltages; a plurality of amplifiers each having a plurality of stages; means connecting each of said amplifiers to separate bridge outputs to provide the signal voltage inputs to said amplifiers; bias means in the first stage of each of said amplifiers such as to limit the grid current drawn by the first stage and reduce possible loading of the bridge; a further stage in each of said amplifiers having a first and a second electron tube, each having a plate, a cathode and a control electrode, comprising a discriminator stage; means in each of said amplifiers impressing a signal voltage, dependent upon the signal voltage from said bridge, of the same phase and magnitude on the control electrodes in said discriminator stage; means electrically separating the control electrodes in said discriminator stages to prevent one control electrode from affecting operation of the tube containing the other control electrode, said means comprising a capacitor between said control electrodes; means applying alternating plate supply voltages to the plates of the tubes in the discriminator stages, the phase of the voltage on one of the plates in each discriminator stage being opposite in phase to the voltage on the other plate in the discriminator stage; and means applying an alternating bias voltage on the cathodes of the tubes in the discriminator stages, the bias voltage placed on each of the cathodes being of the same phase as the voltage on the plate of that tube.

5. A first and a second electron tube, each having a plate, a cathode and a control electrode, comprising a discriminator stage; a means for applying a single signal voltage to both of said control electrodes; means electrically separating said control electrodes to prevent the operation of one of said tubes from affecting the operation of the other of said tubes, said means comprising resistors and capacitors in series; and means for applying an alternating bias voltage to said cathodes to prevent simultaneous operation of both tubes, said bias voltage on one cathode being of the opposite phase of the bias voltage on the other cathode, said means charging said capacitors in such a manner as to produce a negative bias on said control electrodes.

6. A first and a second electron tube, each having a plate, a cathode and a control electrode, comprising a discriminator stage; means applying the same signal voltage from a signal voltage source to both of said control electrodes; a source of alternating bias voltage connected to said cathodes; and means electrically separating said control electrodes to prevent the control electrode of one tube from drawing current and holding both control electrodes negative, said means comprising a capacitor connected between said control electrodes, said capacitor being charged by means including said source of alternating bias voltage.

7. A first and a second electron tube, each having a plate, a cathode and a control electrode, comprising a discriminator stage; means applying the same signal voltage from a signal voltage source to both of said control electrodes; means electrically separating said control electrodes to prevent the control electrode of one tube from drawing current and holding both control electrodes negative, said means comprising a capacitor connected between said control electrodes; and means for applying an alternating bias voltage to said cathodes to prevent simultaneous operation of said tubes, the bias voltage on one of said cathodes being of the opposite phase of the bias voltage on the other of said cathodes, said alternating bias voltage charging said capacitor in such a manner as to provide a negative bias voltage on said control electrodes when the magnitude of said signal voltage is less than the magnitude of said alternating bias voltage.

8. A first and a second electron tube, each having a plate, a cathode and a control electrode, comprising a discriminator stage; a source of alternating signal voltage; means applying an alternating signal voltage of the same phase and magnitude from said source to both of said control electrodes through separate capacitors; means electrically separating said control electrodes to prevent the potential on the control electrode of one tube from affecting operation of the other tube, said means comprising said separate capacitors connected between said control electrodes; means for preventing loading of said signal voltage source by said control electrodes, said means comprising a resistor between said control electrodes and said source; and means for applying an alternating bias voltage to said cathodes to prevent simultaneous operation of said tubes, the bias voltage on one of said cathodes being of the opposite phase of the bias voltage on the other of said cathodes, said alternating bias voltage charging said capacitor in such a manner as to provide a negative bias on said control electrodes.

9. A first and a second electron tube, each having a plate, a cathode and a control electrode, comprising a discriminator stage; a source of alternating signal voltage; means applying an alternating signal voltage of the same phase and magnitude from said source to both of said control electrodes; means applying an alternating plate supply voltage to the plates of said tubes, the voltage on one of said plates being opposite in phase to the voltage on the other of said plates; and means applying an alternating bias voltage on the cathodes of said tubes, the bias voltage placed on each of said cathodes being of the same phase as the voltage on the plate of that tube.

10. A first and a second electron tube, each having a plate, a cathode and a control electrode, comprising a discriminator stage; a source of alternating signal voltage; means applying an alternating signal voltage of the same phase and magnitude from said source to both of said control electrodes; means electrically separating said control electrodes to prevent the control electrode in one tube from affecting operation of the other tube, said means comprising a capacitor between said control electrodes; means for preventing loading of said signal voltage source by said control electrodes, said means comprising a resistor between said control electrodes and said source; means applying an alternating plate supply voltage to the plates of said tubes, the voltage on one of said plates being opposite in phase to the voltage on the other of said plates; and means applying an alternating bias voltage on the cathodes of said tubes, the bias voltage placed on each of said cathodes being of the same phase as the voltage on the plate of that tube.

11. In combination: a first and a second electron tube each having an anode, a cathode and a control electrode; means for applying a first alternating voltage of a first phase between the anode and cathode of said first tube; means for applying a second alternating voltage of opposite phase to said first voltage between the anode and cathode of said second tube; an input circuit for said first tube including the control electrode and cathode of said first tube; an input circuit for said second tube including the control electrode and cathode of said second tube; a source of alternating signal voltage; means for applying a single alternating voltage from said source between the control electrode and cathode of each tube; means for causing said tubes to discriminate against input voltages which are not in phase with the supply voltages, said means comprising a resistor in each input circuit to limit the extent to which the voltages on the control electrodes may be positive with respect to the cathodes, and a capacitor in each input circuit which charges up to the extent that the input voltage is more positive than the limited permissible positive voltage between the control electrode and cathode and then discharges to cause the control electrode in the same input circuit to have impressed thereon a voltage of greater negative magnitude with respect to the cathode than is the magnitude of the input voltage, the capacitors further being effective to prevent the potential on the control electrode of one tube from affecting operation of the other tube, the resistors further being effective to prevent loading of said source by the potentials on said control electrodes; and means for applying an alternating bias voltage to said cathodes to prevent simultaneous operation of said tubes, the bias voltage on one of said cathodes being of the opposite phase of the bias voltage on the other of said cathodes.

12. In combination: an electrical bridge signaling means having a plurality of signal voltage outputs, each differing in value from the remaining signal voltages; a plurality of amplifiers each having a plurality of stages; means connecting each of said amplifiers to separate bridge outputs to provide the signal voltage inputs to said amplifiers; further means connecting each amplifier to said bridge such that operation of said amplifier due to the signal from said bridge to said amplifier tends to reduce the signal voltage to that amplifier to zero; bias means in the first stage of each of said amplifiers such as to limit the grid current drawn by the first stage and reduce possible loading of the bridge; a further stage in each amplifier having a pair of electron tubes each having an anode, a cathode and a control electrode; means for applying a first alternating voltage of a first phase between the anode and cathode of said first tube; means for applying a second alternating voltage of opposite phase to said first voltage between the anode and cathode of said second tube; an input circuit for said first tube including the control electrode and cathode of said first tube; an input circuit for said second tube including the control electrode and cathode of said second tube; a source of alternating signal voltage; means for applying a single alternating voltage from said source between the control electrode and cathode of each tube; and means for causing said tubes to discriminate against input voltages which are not in phase with the supply voltages, said means comprising a resistor in each input circuit to limit the extent to which the voltages on the control electrodes may be positive with respect to the cathodes, and a capacitor in each input circuit which charges up to the extent that the input voltage is more positive than the limited permissible positive voltage between the control electrode and cathode and then discharges to cause the control electrode in the same input circuit to have impressed thereon a voltage of greater negative magnitude with respect to the cathode than is the magnitude of the input voltage.

13. In combination: an electrical bridge signaling means having a plurality of signal voltage outputs, each differing in value from the remaining signal voltages; a plurality of amplifiers each having a plurality of stages; means connecting each of said amplifiers to separate bridge outputs to provide the signal voltage inputs to said amplifiers; further means connecting each amplifier to said bridge such that operation of said amplifier due to the signal from said bridge to said amplifier tends to reduce the signal voltage to that amplifier to zero; bias means in the first stage of each of said amplifiers such as to limit the grid current drawn by the first stage and reduce possible loading of the bridge; a further stage in each amplifier having a pair of electron tubes each having an anode, a cathode and a control electrode; means for applying a first alternating voltage of a first phase between the anode and cathode of said first tube; means for applying a second alternating voltage of opposite phase to said first voltage between the anode and cathode of said second tube; an input circuit for said first tube including the control electrode and cathode of said first tube; an input circuit for said second tube including the control electrode and cathode of said second tube; a source of alternating signal voltage; means for applying a single alternating voltage from said source between the control electrode and cathode of each tube; and means for causing said tubes to discriminate against input voltages which are not in phase with the supply voltages, said means comprising a resistor in each input circuit to limit the extent to which the voltages on the control electrodes may be positive with respect to the cathodes, and a capacitor in each input circuit which charges up to the extent that the input voltage is more positive than the limited permissible positive voltage between the control electrode and cathode and then discharges to cause the control electrode in the same input circuit to have impressed thereon a voltage of greater negative magnitude with respect to the cathode than is the magnitude of the input voltage, the capacitors further being effective to prevent the potential on the control electrode of one tube from affecting operation of the other tube, the resistors further being effective to prevent loading of said source by the potentials on said control electrodes, and means for applying an alternating bias voltage to said cathodes to prevent simultaneous operation of said tubes, the bias voltage on one of said cathodes being of the opposite phase of the bias voltage on the other of said cathodes.

14. An electronic amplifier circuit, comprising in combination; two electronic discharge devices each having a cathode, an anode, and a control electrode; a source of alternating bias potential having two end terminals and a center tap thereon; circuit means connecting one of said end terminals to one of said cathodes and circuit means connecting the other of said end terminals to the other of said cathodes; two input circuits each comprising a resistor and a capacitor; circuit means connecting one of said resistors and one of said capacitors to one of said control electrodes; circuit means connecting the other of said resistors and other of said capacitors to the other of said control electrodes; a source of alternating signal potential; and circuit means connecting said source of signal potential to said capacitors, said signal potential selectively rendering one of said discharge devices conductive when the magnitude of said signal potential is greater than the magnitude of said alternating bias potential.

15. An electronic amplifier circuit comprising in combination; a discriminator circuit comprising at least two electronic discharge devices each having an anode, a control electrode, and a cathode; a source of alternating bias potential having two end terminals and a center tap thereon; circuit means connecting one of said cathodes to one of said end terminals; circuit means connecting the other of said cathodes to the other of said end terminals; two sources of alternating potential; circuit means connecting one of said sources to one of said anodes and circuit means connecting the other of said sources to the other of said anodes; an input network comprising at least four resistors and two capacitors; circuit means connecting said resistors in a series circuit between said control electrodes and said two condensers in series shunting the two resistors in the center of said series circuit; a source of alternating signal potential, said potential having the same frequency of said alternating bias potential; and circuit means connecting said signal source to the common junction between said condensers so that said signal potential will selectively render one of said discharge devices conductive when the magnitude of said signal potential at least is equal to the magnitude of said bias potential.

16. An electronic amplifier circuit, comprising in combination; an electronic discharge device having an anode, a cathode, and a control electrode; a source of alternating potential having two terminals; circuit means connecting one terminal of said source of potential to said anode; a load device; a source of alternating bias potential having two end terminals; circuit means connecting one of said end terminals to said cathode and the other of said end terminals through said load means to the other terminal of said source of alternating potential; further circuit means connecting said other of said end terminals through a resistor to said control electrode; a capacitor; circuit means connecting said capacitor to said control electrode in such a manner that said alternating bias potential charges said capacitor thereby maintaining a negative bias on said control electrode; a source of alternating signal potential; and circuit means connecting said signal potential source to said capacitor, said source rendering said discharge device conductive when the magnitude of said signal potential exceeds the magnitude of said alternating bias potential.

17. An electronic amplifier circuit, comprising in combination; a discriminator stage comprising two electronic discharge devices each having an anode, a control electrode, and a cathode; two sources of alternating potential; circuit means connecting one of said sources to one of said anodes and the other of said sources to the other of said anodes; an input circuit for each of said discharge devices comprising a resistor and a capacitor; circuit means connecting said input circuits to said control electrodes; a source of alternating bias potential for each of said devices, said source having two end terminals and a center tap thereon; circuit means connecting one of said end terminals to one of said cathodes and the other of said end terminals to the other of said cathodes and the center tap to the input circuits of said discharge devices in such a manner that said alternating bias potential in combination with said means connecting said source of bias potential to said input circuits effectively renders a negative bias voltage on said control electrodes; a source of alternating signal potential; and circuit means connecting said signal potential to said input circuits in the same phase relationship, said signal potential selectively rendering one of said discharge devices conductive when the magnitude of said signal voltage at least equals the magnitude of the signal from said alternating bias potential.

JAMES W. SMITH.

REFERENCES CITED

The following references are of record in the file of this patent:

UNITED STATES PATENTS

| Number | Name | Date |
|---|---|---|
| 1,958,245 | Mittag | May 8, 1934 |
| 2,164,728 | Wey | July 4, 1939 |
| 2,288,600 | Arndt | July 7, 1942 |
| 2,399,695 | Satterlee | May 7, 1946 |
| 2,414,384 | Moseley | Jan. 14, 1947 |
| 2,426,711 | Shaffer | Sept. 2, 1947 |
| 2,434,822 | Van Beuren | Jan. 20, 1948 |
| 2,450,084 | Emerson | Sept. 28, 1948 |
| 2,452,311 | Markusen | Oct. 26, 1948 |